Figure 1:
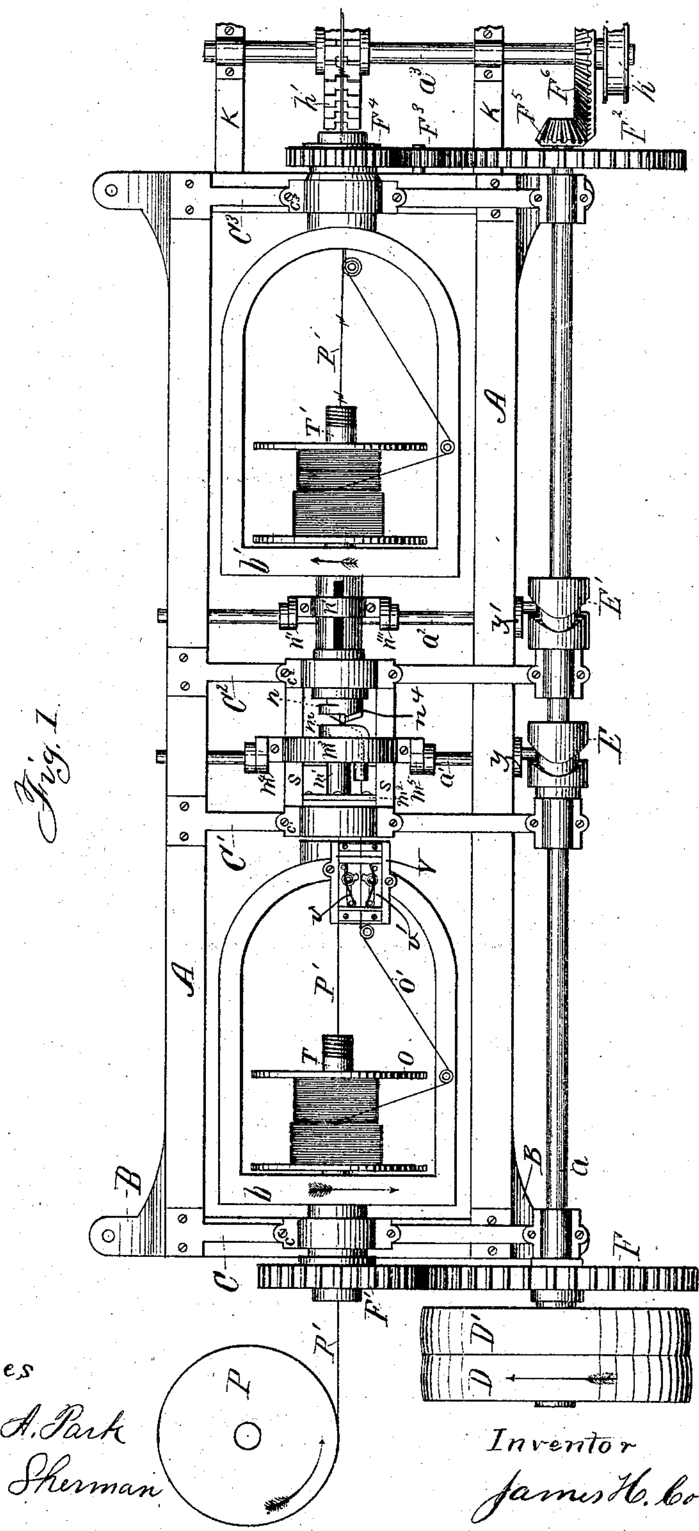
Figure 2:
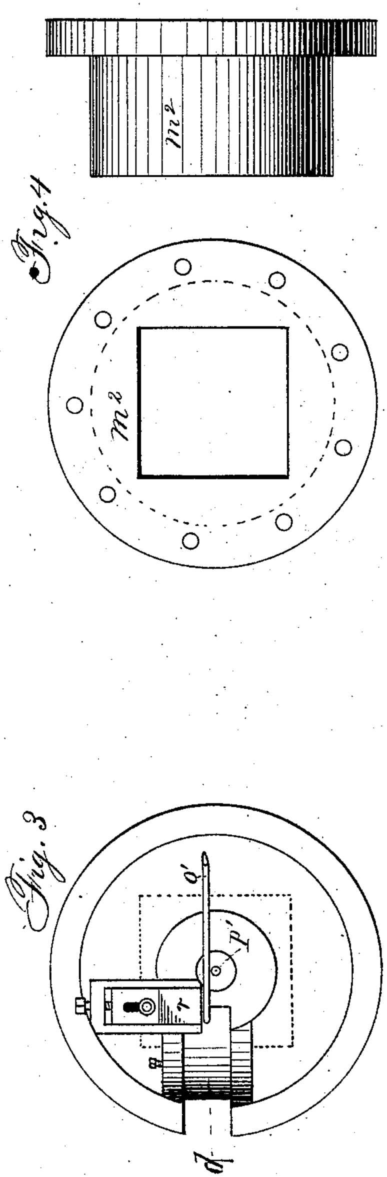

(No Model.)

6 Sheets—Sheet 1.

J. H. COON.

WIRE BARBING MACHINE.

No. 292,206.

Patented Jan. 22, 1884.

Witnesses

William A. Park

Eugene Sherman

Inventor

James H. Coon

N. PETERS, Photo-Lithographer, Washington, D. C.

(No Model.) 6 Sheets—Sheet 2.

J. H. COON.

WIRE BARBING MACHINE.

No. 292,206. Patented Jan. 22, 1884.

p'
o'
m
d
n'

$m^6$

Witnesses:
William A. Park
F. W. Lehman

Inventor,
James H. Coon

N. PETERS. Photo-Lithographer, Washington, D. C.

(No Model.)

6 Sheets—Sheet 3.

J. H. COON.

WIRE BARBING MACHINE.

No. 292,206.

Patented Jan. 22, 1884.

Witnesses:

William A. Park

Eugene Sherman

Inventor:

James H. Coon

N. PETERS, Photo-Lithographer, Washington, D. C.

(No Model.) 6 Sheets—Sheet 4.
J. H. COON.
WIRE BARBING MACHINE.
No. 292,206. Patented Jan. 22, 1884.
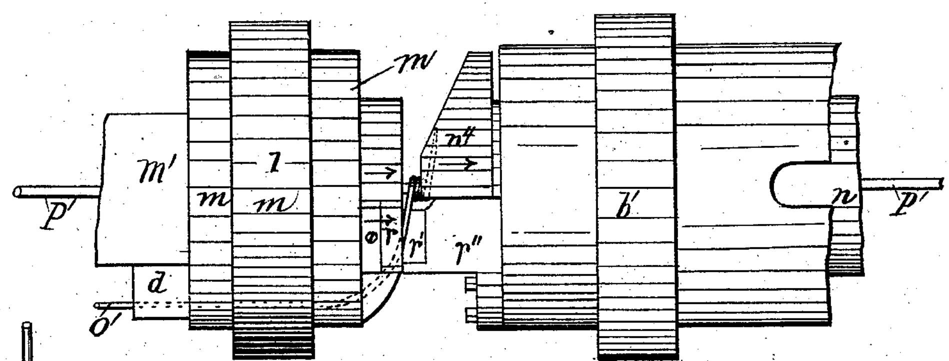
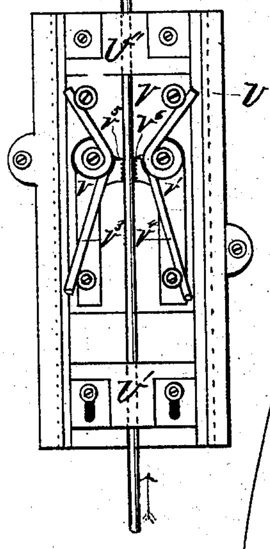
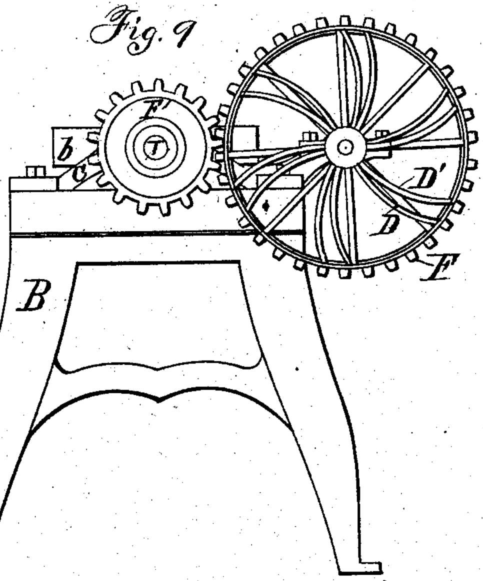
Fig. 10
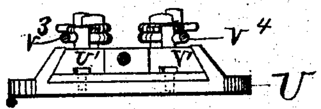
Witnesses
William A Park.
Eugene Sherman.
Inventor
James H. Coon
N. PETERS, Photo-Lithographer, Washington, D. C.

(No Model.)
6 Sheets—Sheet 5.
J. H. COON.
WIRE BARBING MACHINE.
No. 292,206.
Patented Jan. 22, 1884.
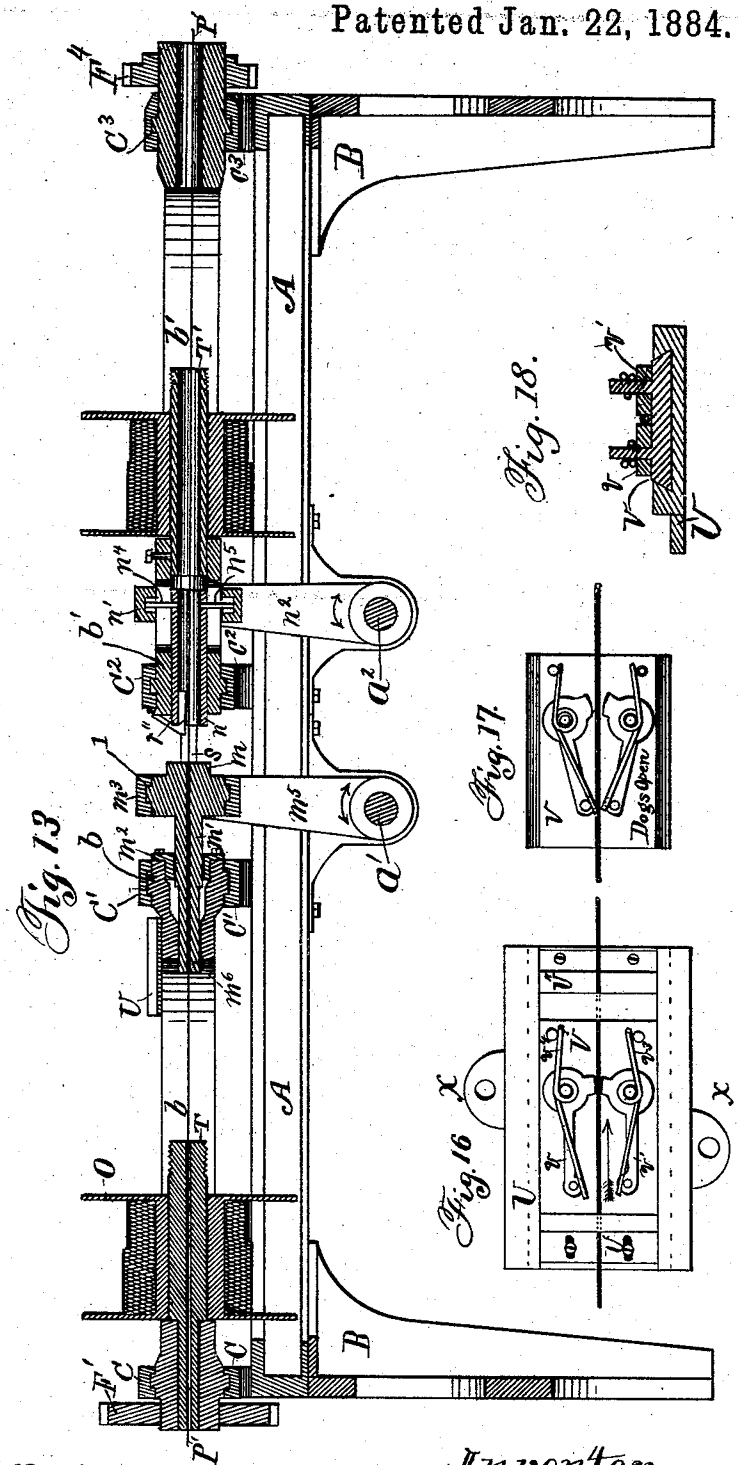
Witnesses:
William A. Park
Eugene Sherman
Inventor:
James H. Coon
N. PETERS. Photo-Lithographer. Washington, D. C.

(No Model.)
6 Sheets—Sheet 6.
J. H. COON.
WIRE BARBING MACHINE.
No. 292,206.
Patented Jan. 22, 1884.
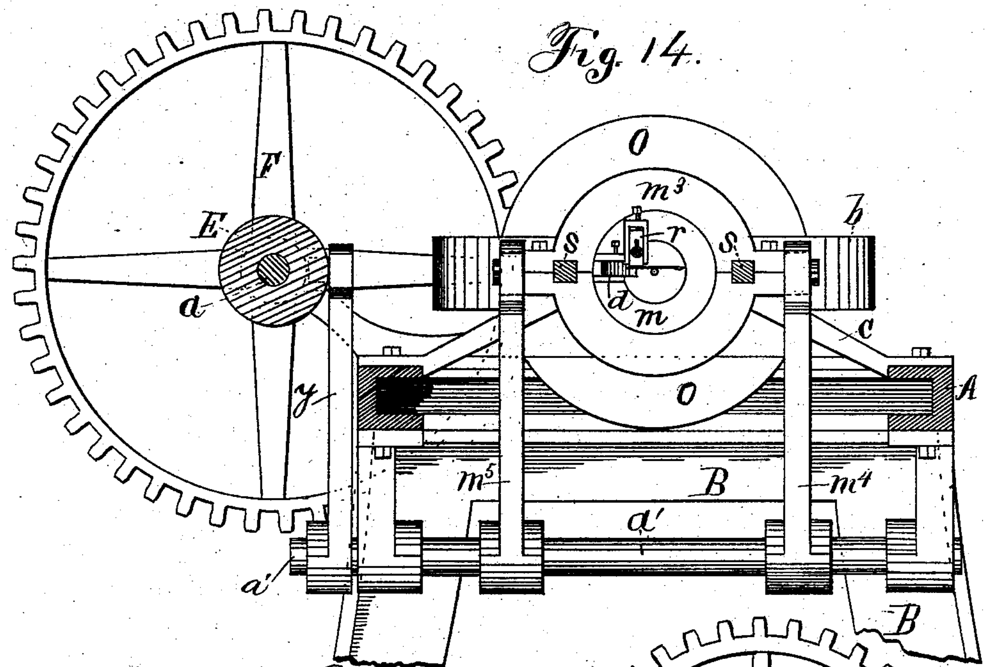
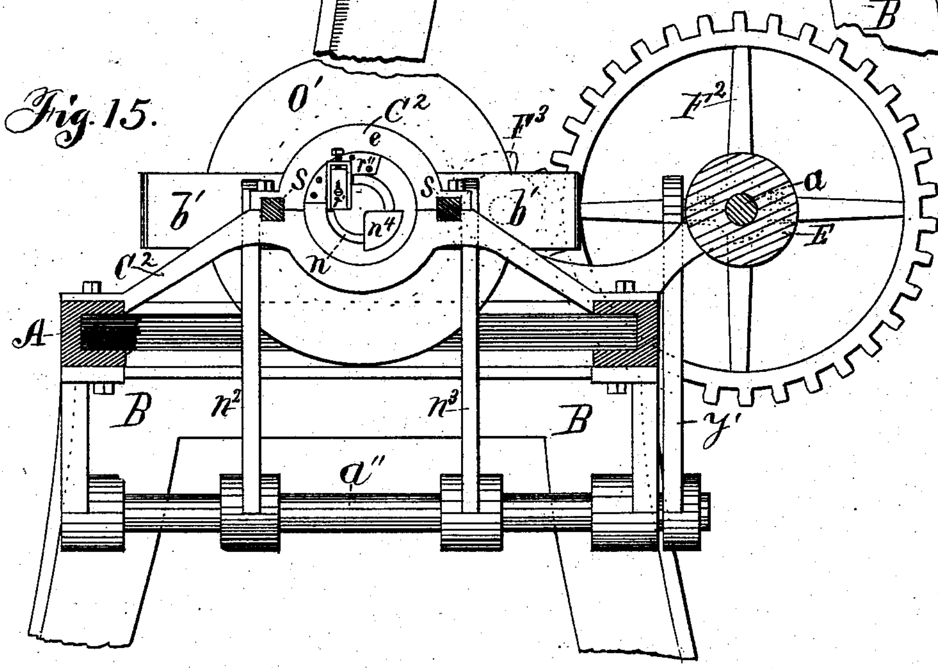
Witnesses:
William A Park
Eugene Sherman
Inventor:
James H. Coon
N. PETERS, Photo-Lithographer, Washington, D. C.

UNITED STATES PATENT OFFICE.

JAMES H. COON, OF DES MOINES, IOWA.

WIRE-BARBING MACHINE.

SPECIFICATION forming part of Letters Patent No. 292,206, dated January 22, 1884.

Application filed August 24, 1883. (No model.)

*To all whom it may concern:*

Be it known that I, JAMES H. COON, a citizen of the United States, residing at Des Moines, in the county of Polk and State of Iowa, have invented a new and useful Improvement in Wire-Barbing Machines, of which the following is a specification.

My invention relates to improvements in wire-barbing machines, and more particularly to that class of machines in which the barb-applying mechanism reciprocates and applies the barbs to a continuously-advancing fence-wire.

The object of my invention is, first, to combine with a rotating and reciprocating head carrying a cutting-tool, and adapted to support both the main wire and the barb-wire, and to rotate the latter around and to advance it across the main fence-wire, rotating and reciprocating mechanism for grasping the free end of the barb-wire and coiling it around the main wire in a direction opposite to that in which the reciprocating head is rotated, and mechanism for in like manner rotating a non-reciprocating cutting-tool arranged to co-operate with the tool carried in the reciprocating head in cutting off the barb; second, to combine the barb-applying mechanism with two rotating fliers so arranged that the main wire to be barbed passes directly through the axis of revolution of both said fliers and the axis of revolution of the spools of wire mounted in said fliers, thereby utilizing the rotary motion of each of said fliers in applying the barb to the fence-wire, and at the same time combining a plain fence-wire with the barbed strand to form a barbed cable fence-wire.

The invention consists in the novel constructions, combinations, and arrangement of parts to be hereinafter fully described, and specifically pointed out in the claims.

In the accompanying drawings, Figure 1 is a plan view of a wire-barbing machine embodying my invention. Figs. 2, 3, 4, 5, 6, 7, 8, 11, and 12 are detached views of working parts, which will be referred to hereinafter. Fig. 9 is an end elevation taken from the left of Fig. 1. Fig. 10 is a plan view of a section of the barbed fence-wire made on this machine.

In the drawings, A represents the frame of the machine, mounted on legs B.

C C′ $C^2$ $C^3$ are bearings in which the fliers *b* and *b′* are mounted. The journals of the fliers are hollow, and are also provided with flanges, which enter corresponding grooves in the boxes, and thus securely hold the fliers from motion in the direction of their axis.

*a* is the main driving-shaft, mounted in boxes provided on the prolonged bearings C C′ $C^2$ $C^3$, and carries a tight and a loose pulley, D and D′, respectively, also driving-gears F and $F^2$ and $F^5$. Gear-wheel F engages a mating gear, F′, attached to the flier *b*, and gear $F^2$ engages an idle wheel, $F^3$, which, in turn, engages a mating gear, $F^4$, attached to flier *b′*. The pinion $F^5$ engages a gear-wheel on shaft *a‴*, mounted in bearings *k k′*, secured to the forward legs of the machine, and rotates the wheel *h′* employed to advance the main fence-wire.

Upon shaft *a‴* is mounted a flanged pulley, *h*, designed to carry a belt and to rotate a receiving-reel, which may be arranged in the usual manner and automatically distribute and wind up the wire.

*a′* is a cross-shaft suspended in bearings attached to the under side of the frame, and is oscillated by cam E, secured on shaft *a* through arm *y*, attached to *a′*, and engaging cam E by means of a stud and roller.

$m^4$ and $m^5$ are arms attached to *a′*, and extend upward, and have vertically-elongated openings near their upper ends, adapted to engage journals provided on the ends of the box $m^3$.

$m^3$ is a box composed of two pieces, grooved so that when the two are secured together by cap-screws they inclose and slide upon the guides *s s* and form a bearing for the reciprocating head *m*.

*s s* are parallel guides arranged in line with the axis of revolution of the fliers, and secured to the bearings C′ $C^2$.

*m* is a head, having a flange, 1, which is fitted to a corresponding groove provided in box $m^3$, in which the head rotates; also having a square stem, *m′*, which is mounted in a flanged bearing, $m^2$, securely attached to and concentric with the forward end of flier *b*; also having a round stem, $m^6$, which rests in and extends through the hollow journal of said flier. It will thus be observed that the reciprocating head *m* has its rotary motion from the flier *b* and its reciprocating motion from the cam E, and that the axis of revolution of head *m* coincides with that of flier *b*.

*d* is a curved wire-guide, secured in head *m*, in a slot provided therein for its reception, by a cap-screw. (Shown in Figs. 2, 3, and 14.)

*r* is a cutting-tool, secured in a seat made integral with head *m* by suitable cap-screws, and has its cutting-edge adjusted so as to just clear the barb-wire as it passes from the curved wire-guide over and across the main fence-wire, and its face is arranged to come flush and even with the projection of head *m* on its face or forward end. The wire-guide *d* and cutting-tool *r* and the face of said projection present a continuous and smooth surface, save only the apertures for the passage of the wires.

U is a block attached to flier *b* by cap-screws, and forms guides and a bearing for a reciprocating plate, V.

U′ is an adjustable block, secured by cap-screws to U, as shown in Figs. 11 and 12, and is employed to guide the barb-wire and to regulate the throw of reciprocating plate V, and thereby regulate the length of the barb advanced across the main fence-wire, as hereinafter described.

V is a plate of any suitable material, constructed to fit and slide back and forth freely in block U, being held in position by the bevel-guides shown in Fig. 12.

*v v′* are dogs, pivoted to reciprocating plate V at their angles, and held in contact with the barb-wire by suitable springs, $v^3$ $v^4$.

Figure 6:
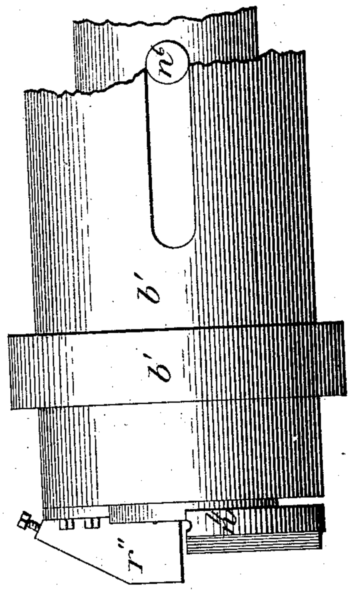
Figure 7:
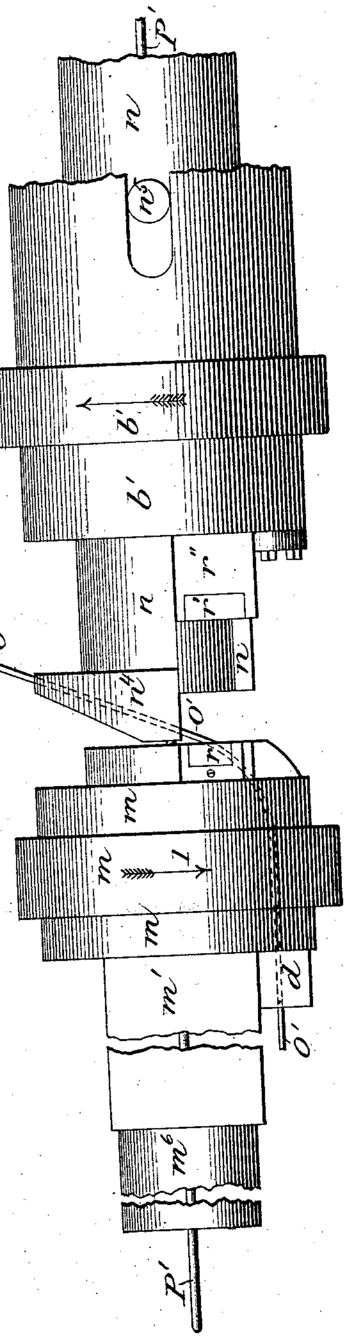
Figure 5:
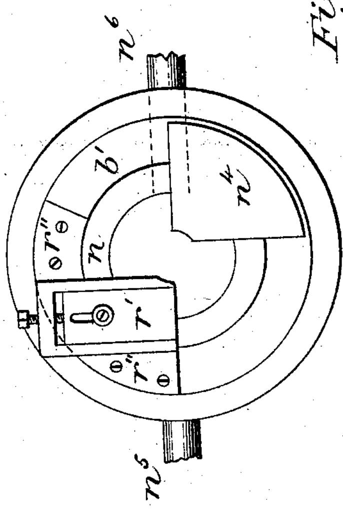

*n* is a tube arranged to slide back and forth in the hollow journal of flier *b′*, and it extends through said journal, and is connected to two semicircular collars by studs which pass through slots in opposite sides of the stem of the flier, said studs being shown in Figs. 5, 6, and 7. The collars and tube are reciprocated back and forth by the following mechanism: The straps *n* are constructed with a groove to receive the collars, and have projecting journals that are engaged by the arms $n^2$ $n^3$ on shaft *a″*, said shaft being oscillated by cam E′ through arm *y′*. Cam F′ is constructed to oscillate arm *y′* once back and once forward at each revolution of shaft *a*, and to allow a short period of rest at the end of the forward throw. Tube *n* has a barb-former, $n^4$, made integral therewith or attached to the end thereof in any suitable manner. This former extends inward toward and near to the center of the tube, and may extend out beyond the circumference of the tube, as shown in detail drawings.

*r′* is a cutting-tool secured in a bearing, *r″*, attached to the rear end of the flier-journal, as shown in Figs. 5 and 7. Tube *n* is cut away on one side to allow it to slide out and in the flier-journal past the bearing *r″*, and is made to rotate with the flier by the bearing against *r″* and by the studs which operate in the grooves in the stem of the flier.

The main fence-wire to be barbed may be mounted on a spool, P, supported on a bracket extending from the frame of the machine, and any desired tension given to the wire, in the usual manner. The wire is then passed through the axis of the tube T in flier *b*, and thence through a guide-tube, T″, in the axis of head *m*, thence directly through tubes *n* and T′, thence through the axis of the forward end of flier *b′*, over the wheel *h′*, and downward and attached to the receiving-reel.

The plain wire to be combined with the barbed strand is mounted on a hollow bearing, T′, and given tension in the usual manner—that is, with a non-rotating washer and nut on the end of the tube T′—and then passed around the guide-wheels, one at the side and the other near the forward end of the flier, thence with the other strand to the receiving-reel and secured thereto.

The barb-wire is mounted on the hollow bearing T in flier *b*, and then passed around guide-wheels, one at the side and the other near the forward end of the flier, thence through an opening in U′, thence between the jaws of dogs *v v′*, thence through an opening in U″, thence through an opening in the forward journal of flier *b*, thence into and through wire-guide *d*. The course of the barb-wire, after entering the opening in U′, should be in a right line parallel with the axis of revolution of the flier until it is deflected toward the main wire by the curved guide *d*, and the several openings through which it passes act as guides for the wire.

The operation of my machine in applying barbs to a fence-wire and forming a barbed-cable fence-wire is as follows: Power is applied to pulley D in the direction indicated by the arrow. Fliers *b* and *b′* will be rotated in opposite directions, as indicated by the arrows, and as arranged the fliers will rotate twice as fast as shaft *a*. When the machine is set in motion, wheel *h′* commences to advance the main wires through the machine at a uniform speed.

The barb-wire is fed across the main fence-wire at regular intervals, as follows: By the operation of cam E the reciprocating head *m* will be thrown backward, and by this backward motion will have a tendency to push the barb-wire back through jaws $v^5$ $v^6$. These jaws and the reciprocating plate V will therefore be pushed back by the barb-wire until plate V comes in contact with stop U′. At this point the jaws will hold the barb-wire and prevent it from further receding, and as the motion of head *m* continues the barb-wire will be thrust through wire-guide *d* and across the main fence-wire, and when head *m* has reached the end of its backward motion the barb has been thrust across the main wire far enough to form a barb, after having been coiled around the main wire, as required. When head *m* advances forward, the barb-wire will be drawn from the spool through the several openings described, and will carry the sliding plate and the dogs forward to the stop U″, and will then slip forward between the jaws of the dogs until *m* has reached the end of its forward movement. When head *m* advances, the barb-wire will be held at first by the friction in guide $d$. This will be sufficient until the slack is taken up and plate V comes in contact with U″, and by this time the barb will have been coiled sufficiently to give it a firm grip on the main wire, which grip will then carry it forward through the jaws. The throw of head $m$ should be greater than the length of the barb. Then, by giving more or less motion to reciprocating plate V, the barb-wire projected across the main wire may be shortened or lengthened, as desired. The barb is coiled around the main fence-wire as follows: Head $m$ recedes in advance of tube $n$, and the barb-wire thrust across the main wire does not come in contact with the barb-former $n^4$ during the backward stroke of head $m$, and cam E is so constructed that at the end of each back throw of head $m$ it remains for an instant before returning. During this instant, at the end of the backward stroke, tube $n$ is brought back, so as to occupy the position shown in Fig. 7, and the barb-former catches the free end of the barb-wire. As $m$ advances forward it moves with the same speed as the main wire, and tube $n$ moves with a slightly-increased speed, and as head $m$ and flier $b$ rotate in one direction and carry the barb-wire around the main wire one complete revolution during the advance movement of $m$, and as tube $n$ in flier $b'$ rotates one complete revolution in the opposite direction, the combined action of head $m$ and barb-former $n^4$ coils the free end of the barb-wire twice around the main wire. As the barb is coiled on the fence-wire the free end is shortened, and when the coiling is completed the free end is left projecting from the main wire just sufficiently to form a barb or repelling point. The barb-former is carried forward with slightly greater speed than head $m$, for the purpose of laying the several coils of the barb adjacent to each other, and the surface of the barb-former which comes in contact with the barb-wire is made concave or grooved, to retain the barb and prevent it from slipping off. It is, however, so constructed that when the barb has been completely coiled and cut off it passes freely from the impinging-surface of the barb-former into and through the axis of tube $n$. At the end of the forward throw of head $m$ and tube $n$ they occupy the position shown in Fig. 8, and the cutting-tools $r$ and $r'$ now sever the barb-wire, and head $m$ recedes as before.

The cutting-tools should be adjusted to cut the barbs the instant head $m$ has reached the end of its forward movement.

During the operation of applying the barbs the cable will be formed by flier $b'$ by carrying the wire mounted in said flier around and combining it with the barbed strand.

Having now fully described one successful manner of constructing and applying my invention, what I claim as new, and desire to secure by Letters Patent, is—

1. In a wire-barbing machine, two fliers rotating in opposite directions, with means for supporting and advancing the main wire continuously, and means for supporting the barb-wire, in combination with reciprocating mechanism for applying barbs, substantially as described.

2. In a wire-barbing machine, the flier $b$, reciprocating dogs $v$ and $v'$, curved guide $d$, and reciprocating head $m$, in combination with the rotating and reciprocating tube $n$ and barb-former $n^4$, substantially as and for the purpose set forth.

3. In a wire-barbing machine, the rotating and reciprocating head $m$ and cutter $r$, in combination with the continuously-rotating cutter $r'$, substantially as and for the purpose set forth.

4. In a wire-barbing machine, the rotating and reciprocating head $m$ and cutter $r$, in combination with the rotating and reciprocating barb-former $n^4$ and the continuously-rotating cutter $r'$, substantially as and for the purpose set forth.

5. In a wire-barbing machine, mechanism for rotating the barb-wire around the main fence-wire in one direction, in combination with mechanism for simultaneously coiling the free end of the barb-wire around the main fence-wire in the opposite direction, substantially as described.

JAMES H. COON.

Witnesses:

WILLIAM A. PARK,
EUGENE SHERMAN.